Dec. 11, 1923.

H. W. CRANE 1,476,692

RIM TOOL AND WHEEL PULLER

Filed Oct. 19, 1921    3 Sheets-Sheet 1

Harry W. Crane
Inventor

Dec. 11, 1923.
H. W. CRANE
RIM TOOL AND WHEEL PULLER
Filed Oct. 19, 1921   3 Sheets-Sheet 2
1,476,692
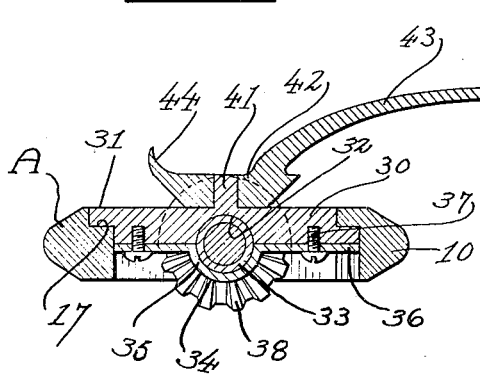
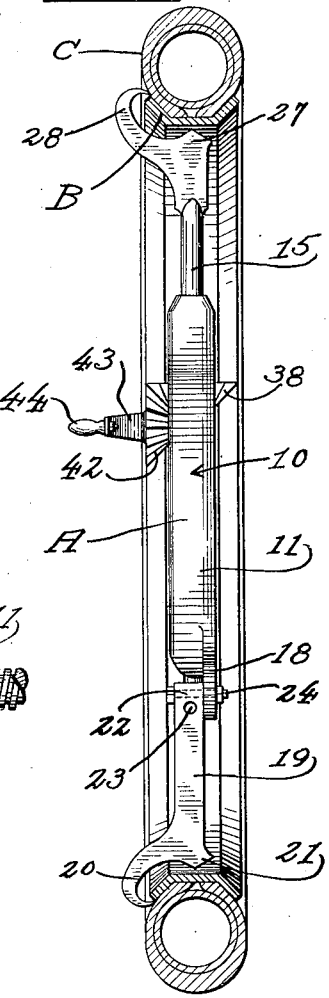
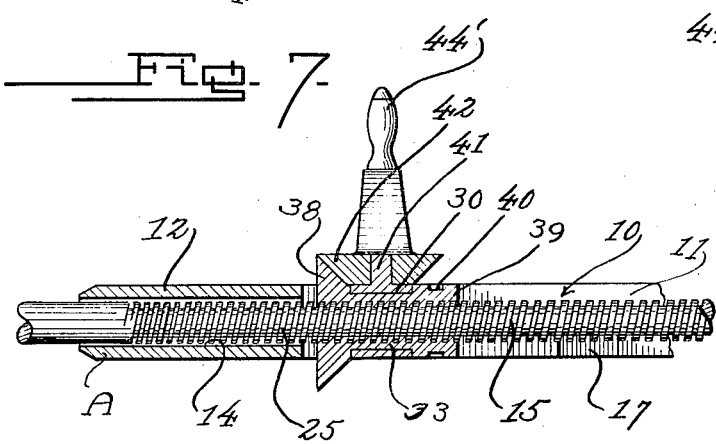
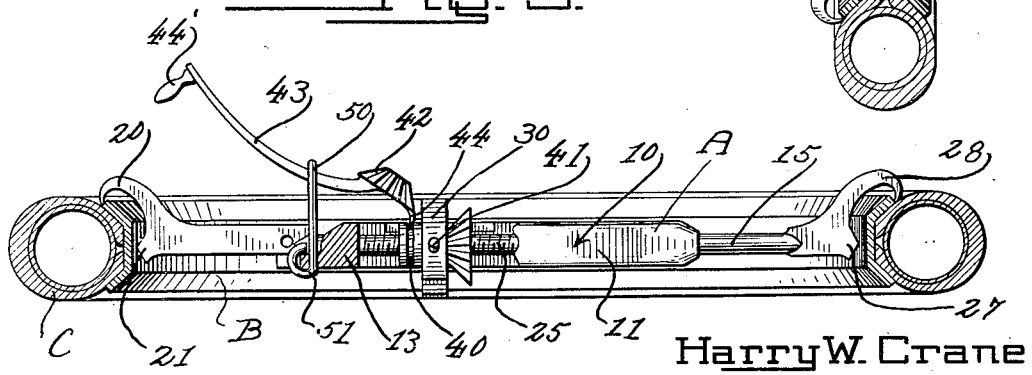
Harry W. Crane
Inventor Dec. 11, 1923.

H. W. CRANE

RIM TOOL AND WHEEL PULLER

Filed Oct. 19, 1921

Harry W. Crane
Inventor

Patented Dec. 11, 1923.

1,476,692

UNITED STATES PATENT OFFICE.

HARRY W. CRANE, OF BRIDESBURG, PHILADELPHIA, PENNSYLVANIA.

RIM TOOL AND WHEEL PULLER.

Application filed October 19, 1921. Serial No. 508,657.

*To all whom it may concern:*

Be it known that I, HARRY W. CRANE, a citizen of the United States, residing at Bridesburg, Philadelphia, in the county of Philadelphia and State of Pennsylvania, have invented certain new and useful Improvements in Rim Tools and Wheel Pullers, of which the following is a specification.

This invention relates to tools of that type which are especially designed for use in connection with motor vehicles, and the primary object of the invention is to provide an improved tool, which can be effectively used both for the removing and placing of tires upon wheel rims and for the pulling of wheels from off their axle ends or spindles.

A further object of the invention is to provide a combined automobile tool, which embodies means for expanding or contracting a vehicle rim to facilitate the placing or removing of a tire from the rim, and means for engaging a vehicle wheel and the axle or spindle end for pulling the wheel from off said axle or spindle, the improved combined tool being of simple and compact nature whereby the same can be easily carried in a tool box or under the vehicle seat.

A further object of the invention is the provision of a combined tool of the above character including a body, means carried by the body for engaging the wheels to be pulled or the rim to be expanded or contracted, an adjustable member having means formed on one end thereof for engaging an axle or spindle end, means formed on the other end for engaging the rim to be expanded or contracted, and a novel means for adjusting the said members in relation to each other, the said novel adjusting means permitting a quick adjustment to be had in relation to the members for permitting the quick disposing of the members in relation to the rim or wheel, and a screw operated means for permitting a fine and powerful adjustment to be had.

A still further object of the invention is to provide a tool which is not only capable of expanding and contracting the vehicle rims and pulling the wheels off their axles, but which is also susceptible for use as a means for pulling gear wheels from off of their shafts, said tool also embodying means for permitting adjustment to be had between the two mentioned members by means of a lever in lieu of the slow screw adjusting means.

With these and other objects in view, the invention consists in the novel construction, arrangement and formation of parts, as will be hereinafter more specifically described, claimed and illustrated in the accompanying drawings, forming a part of this specification, in which drawings:

Figure 2 is an edge elevation of the improved tool showing the same in use for contracting a rim, the rim and tire being shown in diametric cross section.

Figure 3 is an edge elevation of the tool partly in section, showing the means for adjusting the two members in relation to each other by using the operating crank as a lever, the tool being applied to a rim, the rim and tire being shown in cross section.

Figure 6 is an enlarged transverse sectional view through the improved tool.

Figure 7 is an enlarged fragmentary longitudinal section through the improved tool.

Referring to the drawings in detail, wherein similar reference characters designate corresponding parts throughout the several views, the letter A indicates the improved tool; B, a rim, with which the tool can be associated; and C a tire disposed upon said rim.

Figure 1:
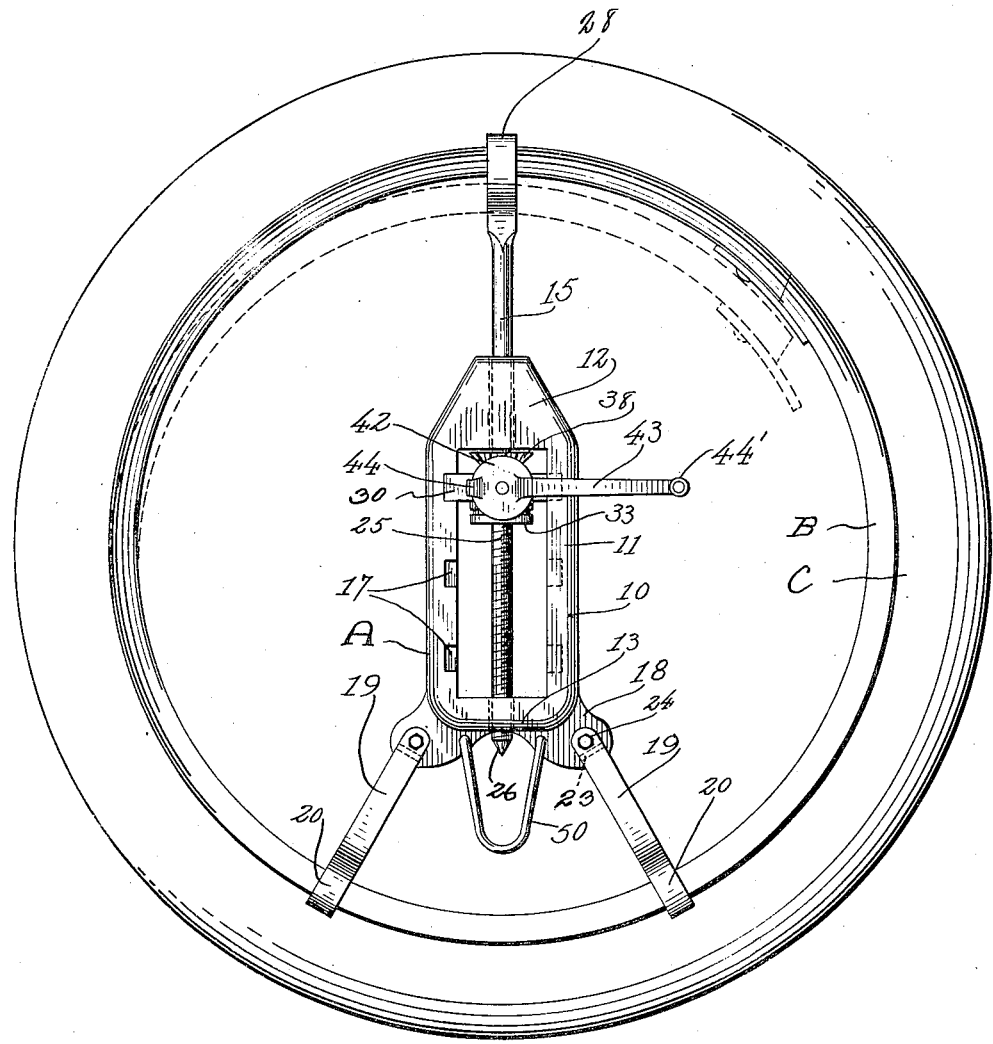
Figure 1 is an elevation of the improved tool showing the same in use for contracting a rim.

The improved tool A comprises a main frame 10, which may be cast or formed in any preferred manner. This frame 10 includes the side bars 11 and the end bars 12 and 13. The end bars 12 and 13 are provided with longitudinally aligned bores 14 through which the adjusting rod 15 is adapted to extend. The frame 10 and the adjusting rod 15 constitutes the two members which are to be adjusted in relation to each other. This frame is constructed so that the same can be placed upon the market at a minimum cost but still have sufficient rigidity for the purpose intended. The side bars 11 at equidistantly spaced points are provided with pairs of notches 17. One notch of each pair is disposed upon one side of one side bar 11, while the other notch of each pair is disposed on the other face of the other side bar. Thus it can be seen that the notches of each pair of notches are disposed on opposite faces of the side bars. The purpose of this will be hereinafter more fully apparent. One end of the frame 10 is provided with outwardly extending ears 18, which are adapted to support the outwardly extending arms 19. These arms 19 constitute the means for engaging the work. The outer end of the arms 19 are provided with laterally extending hooks 20, which form means for engaging the rim B, and means for engaging the wheel or gear which is to be pulled. Inward of the hooks 20, the arms 19 are provided with points 21 for engaging the inner surface of a rim when it is desired to expand the rim, as will be hereinafter more fully described. The inner end of each arm 19 is provided with oppositely extending bores 22 and 23, either one of which is adapted to receive a removable pivot bolt 24. The oppositely extending bores 22 and 23 form means for permitting the arms 19 to be positioned in various relations to the frame 10, so as to permit the hooks 20 to readily engage different kinds of work. The pivot bolts 24 permit the arms to be swung thereon as a pivot.

The adjusting member 15 includes a threaded shank 25, the inner end of which is pointed, as at 26, for engaging an axle end or shaft end in case a wheel or gear is to be pulled, as will be hereinafter more fully described. The outer end of the adjustable member 15 is constructed similar to the outer end of the arms 19, and the same is provided with a point 27 for engaging the inner face of a rim to be expanded, and a laterally extending hook 28 for engaging one flange of the rim to be contracted. The threaded shank may have the thread thereof of any desired pitch most advantageous for the character of work with which the tool is to be used. The means for adjusting the adjustable member 15 in relation to the frame 10 consists of a transversely extending bar or casting 30, which is provided at its opposite edges with oppositely disposed lugs 31, which are adapted to fit in the oppositely positioned pairs of notches 17. This transversely extending bar or casting 30 is provided with a simi-circular bearing 32, formed in one face thereof, for the reception of the rotatable sleeve 33. This sleeve 33 is retained in the bearing by means of a detachable bearing strap 34, which includes a semi-cylindrical central portion 35, and outwardly extending ears 36, which are held in place by machine screws 37, which extend into the transversely extending bar or casting 30. One end of the rotatable sleeve 30 has formed thereon a bevelled gear 38, which engages one edge of the transversely extending bar 30, and the opposite end of the sleeve has formed thereon a head 39, which engages the opposite edge of the transversely extending bar 30, said head 39 being provided with an annular groove 40, the purpose of which will be hereinafter more fully described. The sleeve 33, the gear 38, and the head 39 can have the bore thereof provided with female threads for the reception of the threaded portion 25 of the rod or adjustable member 15. One face of the bar 30 is provided with an upstanding stud 41, on which is rotatably mounted a bevelled gear 42, which meshes with the bevelled gear 38. The bevelled gear 42 has formed thereon the arcuately curved handle 43, which constitutes a crank and a lever, as will be hereinafter more fully apparent. One end of the handle 43 is provided with the outwardly extending crank hand grip 44'. The gear 42 diametrically opposite the handle 43 is provided with a hook 44, the purpose of which will be also hereinafter more fully described.

In use of the improved tool for tire work the transversely extending bar is turned so as to move the lugs 31 from out of the notches 17, and this bar is then slid longitudinally of the frame 10, in order to initially adjust the hooks 20 and the hook 28 in relation to the rim, which is to be expanded or contracted. After the initial adjustment has been made, the transversely extending bar 30 is again turned, so as to position the lugs 31 in the nearest pair of notches 17. If the rim is to be contracted for permitting the easy removal of a tire therefrom, the hook 28 is placed over one flange of the rim, as clearly shown in Figures 1 and 2 of the drawings, adjacent to the split portion thereof. The hooks 20 are then placed over one flange of the rim at a point substantially diametrically opposite the hook 28. The hand grip 44 is then grasped, and the handle is turned so as to rotate the gear 42, which will in turn rotate the gear 38 and thread the rod or adjustable member 15 inwardly, which will effectively contract the rim and permit the easy removal of the tire.

When it is desired to expand the rim, the points 21 and 27 are placed in engagement with the inner face of the rim, and the crank handle 43 is rotated in the opposite direction so as to feed the rod or adjustable member 15 outwardly, which will effectively expand the rim as is readily apparent.

In some instances, it may not be necessary to use the feed nut and screw adjustment, as the rim may be relatively easy to contract and expand, and in this instance the handle 43 is used as a lever and is removed from the stud 41. The bar 30 is turned, so as to remove the lugs 31 from out of the notches 17 and the lugs are simply rested on the side bars 11.

The lever or handle 43 is then placed through the bail 50, which is pivotally secured to the frame 10, as at 51, intermediate the ears 18 and the hook 44 is placed in the annular groove 40. It can be seen that by lifting up on the handle 43, the adjustable member or rod 15 will be drawn inwardly and the frame 10 will be drawn inwardly, thus contracting the rim.

Figure 4:
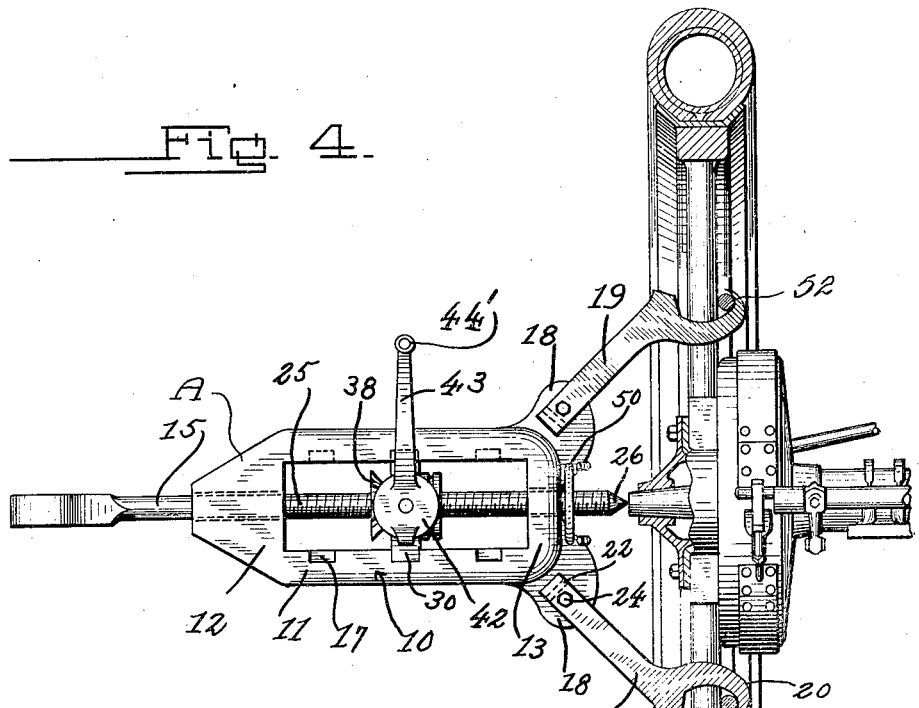
Figure 4 is an elevation of the improved tool showing the same in position for pulling a wheel, the wheel being shown in cross section.
Figure 5:
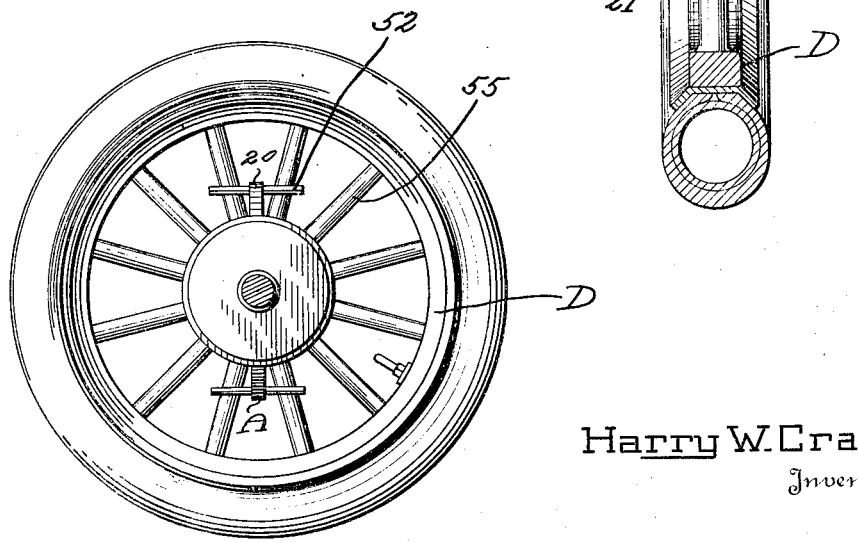
Figure 5 is an inner elevation of a wheel, showing the means of connecting the tool to the spokes thereof when the wheel is to be pulled from its axle.

When it is desired to use the tool, either as a wheel puller or gear puller, the arms 19 are given a quarter turn and placed on the ears 18, as shown in Figure 4 of the drawings, and the bolts 24 are placed through the bores 23. The hooks 20 are then inserted intermediate the spokes 55 of the wheel, which is designated by the letter D in the drawings and hooked over cross bars 52, which engage certain of the spokes 55, which prevent the withdrawal of the hooks from between the spokes. The bar 30 is then given a slight turn, so as to move the lugs 31 from out of the pair of notches 17, which it is in engagement with and the whole bar and the adjusting member 15 is moved inwardly until the point 26 will engage the axle or shaft end, the hub cap being previously removed. When this initial adjustment has been accomplished, the bar 30 is given a slight turn back so as to move the lugs 31 into the nearest pair of notches 17 and the handle 43 is then turned as to feed the rod or adjustable member 15 inwardly, which will draw the frame outwardly and draw the wheel from off its spindle or shaft.

When a gear is to be pulled, the arms 19 can be turned so that the hooks 20 thereof will extend inwardly and a flat bar can be laid across the inner face of the gear and the hooks hooked over the terminals of the bar. The same process is then followed out as when a wheel is being pulled from off its axle or spindle.

From the foregoing description, it can be seen that a simple and compact tool has been provided, which will effectively permit the expanding and contracting of wheel rims to facilitate the placing and removing of tires with respect to the rim, and which will permit the easy pulling of wheels from off their spindles and axles, and gears from off their shafts. When the tool is to be transported, the handle 43 can be moved off the stud 41 and the bar 30 removed from the frame and placed longitudinally thereof, as can be the handle. The rod or adjustable member 15 is moved inwardly to substantially a central position and the arms 19 are swung back on the ears 18. This will form a compact structure, which will occupy but a small amount of space.

Changes in details may be made, without departing from the spirit or scope of this invention; but,

I claim:

1. A combined tool for use in connection with motor vehicles comprising a frame, pivoted hooks carried by one end of the frame, an adjustable bar carried by the frame, means for adjusting the bar, a hook formed on one end of the bar, and an axle or shaft engaging means formed on the opposite end of the bar.

2. A combined tool comprising a frame, an adjustable member slidably associated with the frame, means for adjusting the member in relation to the frame, pivoted hooks carried by one end of the frame, a rigid hook carried by one end of the adjustable member, the opposite end of the adjustable member having means formed thereon for engaging an axle or shaft, and a bearing point formed on the adjustable member and on said pivoted hooks inward of the bills thereof.

3. A combined rim tool, wheel and gear puller comprising a frame, pivoted work engaging members carried by one end of the frame, a slidable member carried by the frame, work engaging members carried by the opposite ends of the sliding bar, means for permitting the quick initial adjustment of the sliding member in relation to the frame, and means for permitting a fine adjustment of the adjustable member in relation to the frame.

4. A combined rim tool, wheel puller and gear puller comprising a frame, work engaging members carried by one end of the frame, a slidable member associated with the frame, a screw and feed nut mechanism for adjusting the sliding member and frame in relation to each other, and means for permitting an initial quick coarse adjustment to be had between the sliding member and frame.

5. A combined rim tool, wheel and gear puller comprising a frame having spaced pairs of notches formed therein, a sliding rod carried by the frame, work engaging members carried by the opposite ends of the rod and by one end of the frame, a transverse bar associated with the frame arranged to seat in any one of the pair of notches, an adjusting means carried by the bar for adjusting the frame and rod in relation to each other.

6. A combined rim tool, wheel and gear puller comprising a frame, pivoted arms carried by one end of the frame, work engaging members carried by the terminals of the arm, a sliding rod associated with the frame, work engaging members carried by the opposite ends of the rod, the frame having spaced pairs of notches formed therein, a transversely extending bar, a rotatable feed nut carried by the bar, a crank detachably carried by the bar, means for operatively connecting the crank with the feed nut, the rod having a portion of its length threaded and mounted in said feed nut, the transversely extending bar having means formed on the terminals thereof for detachably fitting in any one of said pair of notches to permit an initial coarse adjustment of the frame and rod in relation to each other.

7. A combined rim tool, wheel and gear puller comprising an open longitudinally extending frame, pivoted arms carried by one end of the frame, work engaging members carried by the arms, a slidable rod associated with the frame, work engaging members carried by the opposite ends of the rod, the frame having spaced pairs of notches formed therein, the notches of each pair being formed on opposite sides of the frame, a transversely extending bar, a bearing carried by the bar, an internally threaded sleeve carried by the bar, a gear formed on the sleeve, a stud carried by the bar, a gear rotatably and detachably mounted upon the stud and meshing with the first mentioned gear, an arcuate crank handle formed on the second mentioned gear, the rod being threaded a portion of its length and fitted in said sleeve, the sleeve having a groove formed therein, and a pivoted bail carried by one end of the frame arranged to receive the arcuate crank when the same is detached from the bar, a hook formed on the inner end of the crank for engaging in the groove when the crank is placed in engagement with the bail, and means formed on the terminal of the bar for engaging in any one of the said pair of notches.

8. A tool comprising a frame, a pair of arms having oppositely disposed bores formed on the inner ends thereof, pivot bolts arranged to extend through the bores and into the frame, a sliding rod associated with the frame, hooks formed on the arms and on one end of said rod, pointed heads formed on the mentioned end of the rod and the outer ends of the arms inwardly of the bills of the hooks, a bearing point formed on the inner end of the rod, and means for adjusting the rod and frame in relation to each other.

9. A tool of the class described comprising a frame, work engaging means carried by the frame, a member movably carried by the frame including work engaging portions, means for permitting quick initial adjustment of the movable member with respect to the frame, and means permitting a fine adjustment of the member with respect to the frame.

10. A tool of the class described comprising a frame, work engaging means on the frame, a work engaging member movable on the frame, and adjusting mechanism for said work engaging member capable of selective positioning on various portions of the frame to insure quick adjustment of the work engaging member with respect to said frame, said adjusting mechanism being capable of moving said work engaging member for relatively fine adjustments.

11. A tool of the class described comprising a frame, work engaging means on said frame, a work engaging member movable on the frame, a sleeve in screw threaded engagement with said work engaging member adapted for selective positioning at various locations on said frame, and means for rotating said sleeve to feed said work engaging member with respect to the frame.

12. A tool of the class described comprising a frame, work engaging means movably carried by said frame, a screw threaded bar slidable through said frame having work engaging portions thereon, a sleeve in screw threaded engagement with said bar, a bearing for said sleeve adapted for selective positioning at various points along said frame, whereby said bar may be moved for relatively quick and longitudinal adjustment along said frame, and adjusting means carried by said bearing for rotation of the sleeve therein, whereby said screw threaded bar may be moved for relatively fine adjustments with respect to said frame.

13. A tool of the class described comprising a frame, work engaging means on said frame, a work engaging member movable with respect to said frame, a bail member carried by said frame, and a lever for engagement with said movable work engaging member and with said bail whereby the latter may be used as a fulcrum to move said work engaging member with respect to said frame.

14. A tool of the class described comprising a polygonal shaped frame, work arms pivotally carried at one end of said frame, a screw threaded bar slidably carried longitudinally of said frame frame having the ends thereof extending from opposite ends of said frame for work engaging purposes, a sleeve for screw threaded engagement with said work engaging member, means adjustably supporting said sleeve upon said frame, and operating means carried by said last mentioned means for rotation of said sleeve with respect to said first mentioned means.

HARRY W. CRANE.